(12) United States Patent
McDevitt

(10) Patent No.: US 11,405,664 B2
(45) Date of Patent: *Aug. 2, 2022

(54) SYSTEM AND METHOD FOR RECOGNITION OF ITEMS IN MEDIA DATA AND DELIVERY OF INFORMATION RELATED THERETO

(71) Applicant: HSNi, LLC, St. Petersburg, FL (US)

(72) Inventor: John McDevitt, Clearwater, FL (US)

(73) Assignee: HSNi, LLC, St. Petersburg, FL (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/999,468

(22) Filed: Aug. 21, 2020

(65) Prior Publication Data

US 2021/0044843 A1    Feb. 11, 2021

Related U.S. Application Data

(63) Continuation of application No. 16/426,339, filed on May 30, 2019, now Pat. No. 10,779,019, which is a
(Continued)

(51) Int. Cl.
*H04N 21/234* (2011.01)
*G06F 16/51* (2019.01)
(Continued)

(52) U.S. Cl.
CPC ....... *H04N 21/23424* (2013.01); *G06F 16/50* (2019.01); *G06F 16/51* (2019.01);
(Continued)

(58) Field of Classification Search
USPC ................................................. 382/100, 305
See application file for complete search history.

(56) References Cited

U.S. PATENT DOCUMENTS 6,573,907 B1    6/2003    Madrane
6,968,337 B2    11/2005    Wold
(Continued)

FOREIGN PATENT DOCUMENTS

WO    2010120901 A1    10/2010

OTHER PUBLICATIONS

Chen et al., Content Identification in Consumer Application, 2009 IEEE 978-1-4244-4291-1/09, pp. 1536-1539. ( Year: 2009).*
(Continued)

*Primary Examiner* — Ishrat I Sherali
(74) *Attorney, Agent, or Firm* — Ballard Spahr LLP

(57) ABSTRACT

The system and method disclosed herein relate to the establishment of both the location and identity of individual items in pictures or videos and delivering of related information thereto. Initially, images in video source content are scanned and individual elements in the images are dynamically compared with digital images stored in a database to identify individual items in the image that match the digital images stored in the database. Upon detecting a match, information is accessed in the database that is related to the digital image that matches the identified individual item. The accessed information is then transmitted to a secondary system that is in communication with a display device, such that the accessed information is displayed on the secondary system in coordination with the video source content being displayed on the display device.

23 Claims, 2 Drawing Sheets

Related U.S. Application Data continuation of application No. 16/194,875, filed on Nov. 19, 2018, now Pat. No. 10,327,016, which is a continuation of application No. 15/996,597, filed on Jun. 4, 2018, now Pat. No. 10,136,168, which is a continuation of application No. 15/806,956, filed on Nov. 8, 2017, now Pat. No. 10,003,833, which is a continuation of application No. 15/293,407, filed on Oct. 14, 2016, now Pat. No. 9,843,824, which is a continuation of application No. 15/132,653, filed on Apr. 19, 2016, now Pat. No. 9,503,762, which is a continuation of application No. 14/940,283, filed on Nov. 13, 2015, now Pat. No. 9,681,202, which is a continuation of application No. 14/848,755, filed on Sep. 9, 2015, now Pat. No. 9,344,774, which is a continuation of application No. 13/352,986, filed on Jan. 18, 2012, now Pat. No. 9,167,304.

(60) Provisional application No. 61/433,755, filed on Jan. 18, 2011.

(51) Int. Cl.
| | |
|---|---|
| *G06Q 30/00* | (2012.01) |
| *G06F 16/50* | (2019.01) |
| *G06F 16/70* | (2019.01) |
| *G06F 16/583* | (2019.01) |
| *H04N 21/858* | (2011.01) |
| *H04N 21/233* | (2011.01) |
| *H04N 21/236* | (2011.01) |
| *H04N 21/254* | (2011.01) |
| *H04N 21/81* | (2011.01) |
| *G06V 20/40* | (2022.01) |
| *H04N 21/478* | (2011.01) |
| *H04N 21/2665* | (2011.01) |
| *H04N 21/235* | (2011.01) |

(52) U.S. Cl.
CPC ............ *G06F 16/583* (2019.01); *G06F 16/70* (2019.01); *G06V 20/40* (2022.01); *G06V 20/48* (2022.01); *H04N 21/233* (2013.01); *H04N 21/2353* (2013.01); *H04N 21/23418* (2013.01); *H04N 21/23614* (2013.01); *H04N 21/2542* (2013.01); *H04N 21/2665* (2013.01); *H04N 21/47815* (2013.01); *H04N 21/8126* (2013.01); *H04N 21/8133* (2013.01); *H04N 21/858* (2013.01)

(56) References Cited

U.S. PATENT DOCUMENTS

| | | | |
|---|---|---|---|
| 7,016,532 B2 | 3/2006 | Boncyk et al. | |
| 7,072,669 B1 | 7/2006 | Duckworth | |
| 7,433,833 B2 | 10/2008 | Sako et al. | |
| 7,477,780 B2 | 1/2009 | Boncyk et al. | |
| 7,707,239 B2 * | 4/2010 | Anderson | H04L 67/18 709/202 |
| 7,752,083 B2 * | 7/2010 | Johnson | H04N 21/6581 705/26.1 |
| 7,756,758 B2 | 7/2010 | Johnson et al. | |
| 7,797,204 B2 | 9/2010 | Balent | |
| 7,899,252 B2 | 3/2011 | Boncyk et al. | |
| 7,899,705 B2 | 3/2011 | Fuisz | |
| 7,987,491 B2 | 7/2011 | Reisman | |
| 8,055,688 B2 * | 11/2011 | Giblin | G06Q 40/12 707/804 |
| 8,255,291 B1 | 8/2012 | Nair | |
| 8,311,337 B2 | 11/2012 | Chou | |
| 8,385,646 B2 | 2/2013 | Lang | |
| 8,990,235 B2 | 3/2015 | King et al. | |
| 9,167,304 B2 * | 10/2015 | McDevitt | G06F 16/50 |
| 9,360,945 B2 | 6/2016 | Boncyk et al. | |
| 10,327,016 B2 | 6/2019 | Mcdevitt | |
| 10,779,019 B2 * | 9/2020 | McDevitt | H04N 21/23614 |
| 2002/0198789 A1 | 12/2002 | Waldman | |
| 2006/0240862 A1 | 10/2006 | Neven et al. | |
| 2009/0319388 A1 | 12/2009 | Yuan et al. | |
| 2010/0138875 A1 | 6/2010 | Johnson et al. | |
| 2010/0260426 A1 | 10/2010 | Huang et al. | |
| 2014/0052584 A1 | 2/2014 | Gershon et al. | |
| 2014/0081747 A1 | 3/2014 | Boncyk et al. | |
| 2015/0046289 A1 | 2/2015 | Carey et al. | |
| 2019/0362154 A1 | 11/2019 | Moore et al. | |

OTHER PUBLICATIONS

He, Ruhan, et al., "Garment Image Retrieval on the Web with Ubiquitous Camera-Phone," Proceedings 2008 IEEE Asia-Pacific Services Computing Conference, APSCC 2008, Dec. 12, 2008 Yiian Taiwan, pp. 1584-1589.

Zhao Guannan, et al., "Style Matching Modeil-Based Recommend System for Online Shopping," Computer Aided Industrial Design A Conceptual Design, 2009, i88.5 10th International Conference. Nov. 26, 2009 in Piscataway, NJ, pp. 1095-1999.

* cited by examiner

SYSTEM AND METHOD FOR RECOGNITION OF ITEMS IN MEDIA DATA AND DELIVERY OF INFORMATION RELATED THERETO

CROSS REFERENCE TO RELATED APPLICATION

This application is a continuation of U.S. application Ser. No. 16/426,339, filed May 30, 2019, which is a continuation of U.S. application Ser. No. 16/194,875, filed Nov. 19, 2018, now issued as U.S. Pat. No. 10,327,016 which is a continuation of U.S. application Ser. No. 15/996,597, filed Jun. 4, 2018, now issued as U.S. Pat. No. 10,136,168, which is a continuation of U.S. application Ser. No. 15/806,956, filed Nov. 8, 2017, now issued as U.S. Pat. No. 10,003,833, which is a continuation of U.S. application Ser. No. 15/293,407, filed Oct. 14, 2016, now issued as U.S. Pat. No. 9,843,824, which is a continuation of U.S. application Ser. No. 15/132,653, filed Apr. 19, 2016, now issued as U.S. Pat. No. 9,503,762, which is a continuation of U.S. application Ser. No. 14/940,283, filed Nov. 13, 2015, now issued as U.S. Pat. No. 9,681,202, which is a continuation of U.S. application Ser. No. 14/848,755, filed Sep. 9, 2015, now issued as U.S. Pat. No. 9,344,774, which is a continuation of U.S. application Ser. No. 13/352,986, filed Jan. 18, 2012, now issued as U.S. Pat. No. 9,167,304 and which claims priority to U.S. Provisional Application No. 61/433,755, filed on Jan. 18, 2011, the contents of each of which are incorporated herein by reference into the present application.

BACKGROUND OF THE INVENTION

With the continued development of portable media players, social networking services, wireless data transmission speeds, etc., individuals continue to be presented with more and more image and video content. However, when an individual receives a digital picture or a video feed or the like, the individual might also wish to have further information about something in the content, such as an item, a person, a logo or even a building or landmark. For example, a video feed might include a scene filmed at the Statue of Liberty and the viewer may wish to receive historical information about this landmark. Moreover, a video feed might include a famous actress carrying a new designer handbag or a famous athlete using a cell phone, each of which may be of interest to a consumer who wishes to learn more information about the item, share the item with a friend via a social networking website or the like, or even purchase the item. In conventional systems, the viewer/consumer is unable to quickly transform their general interest of the particular item into the ability to get additional information or engage in an e-commerce shopping session related to the item of interest.

SUMMARY OF THE INVENTION

Accordingly, what is needed is a system that recognizes individual items or sets of items (collectively items) in source content and accesses information relating to the recognized items that can then be requested by or automatically pushed to the end user in order to facilitate additional interaction related to the recognized item. Thus, the system and method disclosed herein relate to the determination of both the location and identity of items in images (both pictures and videos) and the rendering of additional functionality for these identified items when the end user "points to", "clicks", or otherwise selects the identified items.

Specifically, a system is provided that includes an electronic database that stores a plurality of digital images of items and information related to each of the plurality of items; and a processor that scans source content having a plurality of elements and identifies any items that match the plurality of items stored in the database. In addition, the processor generates position data indicating the position of the identified item and links and/or merges the item with the information related to the identified item(s) and the position data. Moreover, a method is provided that scans source content, identifies items in the source content that match a digital image stored in an electronic database, generates position data indicating the position of the identified item, accesses information related to the identified item, and links and/or merges the item with the position data and the information related to the identified item.

DETAILED DESCRIPTION OF THE INVENTION

The following detailed description outlines possible embodiments of the proposed system and method disclosed herein for exemplary purposes. The system and method are in no way intended to be limited to any specific combinations of hardware and software. As will be described below, the system and method disclosed herein relate to the establishment of both the location and identity of individual items in images. Once the one or more items in the images and/or video are identified and the locations of the items established, additional functionality related to those identified items can occur when those identified locations are "pointed to", "clicked" or otherwise selected (e.g., purchase an item, request information, select another video stream, play a game, share the item, rate, "Like", and the like).

Figure 1:
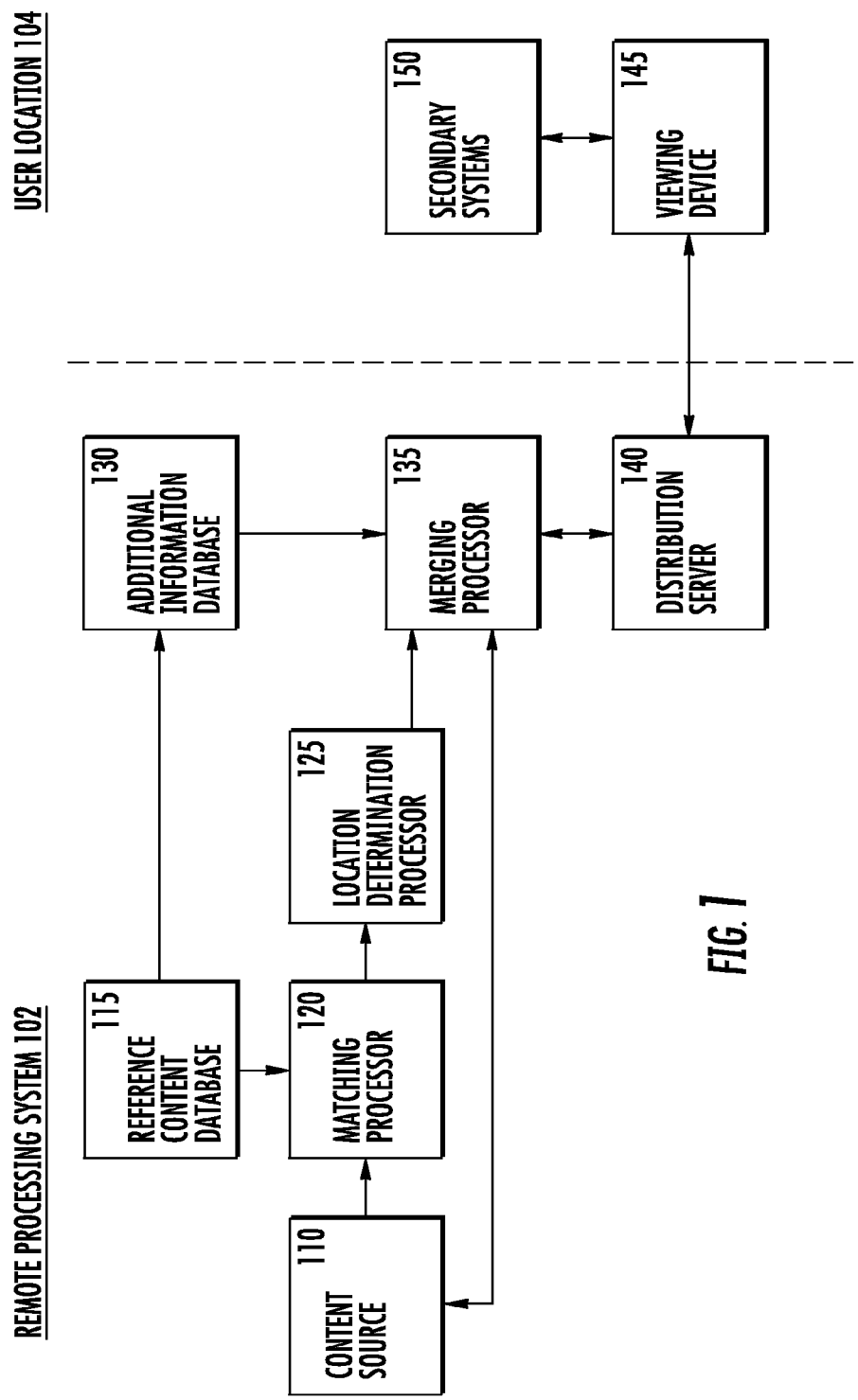
FIG. 1 illustrates a block diagram of a system for recognizing items in media data and delivery of related information in accordance with an exemplary embodiment.

FIG. 1 illustrates block diagram of a system 100 for recognizing items in media data and delivery of related information in accordance with an exemplary embodiment. In general, system 100 is divided into remote processing system 102 and user location 104. In the exemplary embodiment, the remote processing system 102 can be associated with a secondary processing system (e.g., a digital video recorder, a product supplier, etc.), which can be located at either remote processing system 102 or user location 104, and/or content provider that is capable of processing data transmitted to and from user location 104. A general illustration of the relationship between a user location, a product supply server, i.e., secondary processing system, and a content provider is discussed in U.S. Pat. No. 7,752,083 to Johnson et al., issued on Jul. 6, 2010, and entitled "METHOD AND SYSTEM FOR IMPROVED INTERACTIVE TELEVISION PROCESSING," which is hereby incorporated in its entirety by reference thereto. Furthermore, user location 104 can be considered any location in which an end user/consumer is capable of viewing an image and/or video feed on a viewing device 145. It is noted that the terms "end user," "user" and "consumer" are used interchangeably herein and can be a human or another system as will be described in more detail below.

As shown in FIG. 1, remote processing system 102 includes content source 110 that provides source images, i.e., source content, that is ultimately transmitted to the user after it is processed by the other components of remote processing system 102, as will be discussed below. In one embodiment, content source 110 can be a content provider, such as that discussed above with reference to U.S. Pat. No. 7,752,083. Furthermore, source content can be live or prerecorded, analog or digital, and still (picture) or streaming (video).

Remote processing system 102 further includes reference content database 115 that contains a plurality of known images (picture or video—collectively images). In particular, reference content database 115 can store images relating to elements that may be displayed in the source content. For example, the stored images can relate to consumer products (e.g., electronics, apparel, jewelry, etc.), marketing or brand items (e.g., logos, marks, etc.), individuals, locations (e.g., buildings, landmarks, etc.), humanly invisible items (fingerprints, watermarks, etc.) or any other elements that are capable of being identified in the source content. The image data in reference content database 115 can be updated on a continuous or periodic basis by a system, a system administrator or the like.

Remote processing system 102 further includes matching processor 120 that is coupled to both content source 110 and reference content database 115. Matching processor 120 is configured to compare images in reference content database 115 with elements in the source content provided by content source 110. More particularly, matching processor 120 uses conventional scanning and image recognition algorithms for scanning image content to compare the elements in the source content with the images stored in reference content database 115 and identify matches. The scanning and related matching process can occur on a continuous or periodic basis. During the matching process, every potential item in the source content is compared with the images stored in reference content database 115. When the comparison results in a match, matching processor 120 identifies the matched item. If there is no match, matching processor 120 continues to scan the source content as it updates/changes to continually or periodically check whether elements in the source content match images in reference content database 115. It should be appreciated that the areas of the source content that do not have any identified items in them can be identified as such.

It is further contemplated that reference content database 115 can store certain images as predetermined marker items. Specifically, reference content database 115 can store images with preset identifying data (e.g., marker characteristics) that enables matching processor 120 to more quickly and more accurately identify items that correspond to the marker characteristics. Preferably, it is contemplated that items being frequently displayed in the source content are stored as predetermined marker items in reference content database 115, such that reference content database 115 is organized to contain subsets of items (associated by marker characteristics) that have a higher probability of successfully matching with elements in specific source content. For example, a subset of items that are more likely to be matched during a sporting event (e.g., team logos) can be generated and referenced during the scanning process when the source content is a game involving the specific team having that logo. As a result, the subset of items may be employed to increase the quality of the item matches (increased correct matches and decreased false positive matches), effectively reducing the processing requirements of matching processor 120. In addition, in one embodiment of the matching process, the items stored in reference content database 115 can include data fields that link similar items. For example, data fields can be provided that link items similar in type, time, relationship, or the like (e.g., all images of televisions have a common field, images of things that occur around an event such as Valentine's Day have a common field, or items that traditionally are linked have a common field, such as salt and pepper). Additionally, matching processor 120 can perform an iterative process to match the element in the source content to the item stored in reference content database 115 by making an initial predicted match in the first image or frame and then refining the prediction for each subsequent scan until a conclusive match is made and the item is identified.

As further shown, location determination processor 125 is coupled to matching processor 120 and is configured to identify the location of any matched items identified by matching processor 120. In the exemplary embodiment, the location of the matched items can be defined in a Cartesian coordinate plane, or in a position based on another location system (collectively X, Y coordinates either as an individual point or a set of points). Location determination processor 125 is configured to generate metadata setting the X, Y coordinates for each matched item's position relative to the source content as a whole. Accordingly, for each matched item's position, determination processor 125 generates metadata for the specific X, Y coordinates of that item as it is positioned within the image of the source content that includes that item. For each subsequent image (including each video frame), location determination processor 125 continues to track the movement of the item as its position varies in the source content and continues to generate metadata corresponding to the item's position. In the exemplary embodiment, the item's position can be denoted by either the X, Y coordinate set or the center point of the item shape.

It should be understood by those skilled in the art that while matching processor 120 and location determination processor 125 are described as separate processors, in an alternative embodiment, a single processor can perform both the matching and location identifying processes as well as the creation of the metadata of identity and location of the items.

Remote processing system 102 further includes additional information database 130. Although additional information database 130 is described in the exemplary embodiment to be located at remote processing system 102, additional information database 130 can also be located a user location 104, as will be described in more detail below.

In either embodiment, additional information database 130 contains additional information about the reference images stored in reference content database 115. Specifically, additional information database 130 is configured to store descriptive and relational information related to the item, including pricing information, sizing information, product description, product reviews and the like, as well as links to other information sources such as Internet websites. Thus, in operation, once the matched item is identified, remote processing system 102 subsequently accesses additional information database 130, which identifies all additional information relating to the specific matched item. It should be appreciated that there may be no additional information in additional information database 130 related to the items. In a refinement of the exemplary embodiment, additional information can be a data path to the more detailed information about an item. Thus, instead of initially providing all additional information related to an item, the additional information initially accessed by additional information database 130 may be a path to this information. Thus, only when the user is interested in the matched item and wishes to view further information about the item, additional information database 130 will subsequently access the metadata relating to the detailed information of the matched item.

It should further be appreciated by those skilled in the art that while reference content database 115 and additional information database 130 are described as separate databases, in an alternative embodiment, a single database can be provided to store both the image information and the additional information about the referenced item.

Once the additional information is identified by additional information database 130, merging processor 135 is provided to merge together this metadata, the metadata relating to the location information calculated by location determination processor 125, and the source content provided by content source 110 into a format that can be received/interpreted by viewing device 145 at user location 104. In the exemplary embodiment in which the source content is being generated live or is prerecorded, the matching is occurring so that the content and the item identification and location metadata are synchronously delivered. In an additional embodiment, the content with the related synchronous item identification and location metadata can be stored and played out directly by distribution server 140 to viewing device 145. The rendering of this combined data can be either visible or invisible in whole or in part. At this point, remote processing system 102 is configured to make the items on the display device "active" by any method known to those skilled in the art, e.g., they are "selectable" or "clickable" by the end user/consumer. Furthermore, distribution server 140 is coupled to merging processor 135 and configured to transmit the new integrated video stream to user location 104 using any conventional data communication method (e.g., over the air broadcast, cable casting, Direct Broadcast Satellite, Telco, wife, 3G/4G, IP enabled, etc.). It is further contemplated that in an alternative embodiment, the process of rendering the item "active" is performed by viewing device 145.

User location 104 comprises viewing device 145 that is configured to receive image/video and audio content (e.g., IP data stream) and is capable of displaying an image/video feed, and, more particularly, the new integrated video stream generated by merging processor 135 and transmitted by distribution server 140. It should be understood that viewing device 145 can be any suitably appropriate device capable of viewing the new integrated image/video stream, including, but not limited to, a computer, smartphone, PDA, laptop computer, notebook computer, television, viewing device with a set-top box type processor (internal or external to the viewing device), a Blu-ray player, a video game console (internal or external to a television or the like), a Tablet PC, or any other device (individually or as part of a system) that can receive, interpret, and render on a screen image/video content as well as interpret the related metadata, receive user input related to the merged content and metadata, display additional information in response to user input and/or send that user input to a locally and/or remotely connected secondary system(s).

Furthermore, viewing device 145 (with internal or external processor(s)) is configured to enable a user to in some way select the identified items and perform additional actions. This process can be either a single process in the case of pictures or can be continuous in the case of video. In the exemplary embodiment, the user's selection of one or more identified items will result in the additional information about the item being displayed to the user on viewing device 145. In addition or in the alternative, the response from the user's selection can be sent to one or more secondary systems on either a continuous or periodic basis. The user can select the identified item using any applicable selection method such as a mouse pointer, a touch screen, or the like. Thus, when viewing device 145 displays the new integrated video stream that includes one or more "active" items, as discussed above, and the end user selects the particular active item, the user can view and/or access the additional information relating to the matched item. As mentioned above, the end user can also be another system. For example, when the new integrated video stream is being interpreted by viewing device 145, one or more items can be automatically identified and selected by viewing device 145 (e.g., an associated processor). For example, if a user is watching a free version of a movie, this embodiment contemplates that the processor of viewing device 145 automatically identifies and selects one or more items causing information (e.g., product advertisements) to be displayed to the end user. Alternatively, if the user pays to download and watch the movie, this feature can be turned off.

It is also noted that in an alternative embodiment, the new integrated video stream generated by merging processor 135 only includes metadata relating to the item's identification and position. Specifically, in this embodiment, additional information in additional information database 130 that is related to the identified item is not initially merged into the integrated video stream. Instead, the integrated video stream is transmitted to the end user without the additional information. Only after the end user selects the identified item, a request is sent by viewing device 145 to additional information database 130 at remote processing system 102, which accesses the additional information and transmits it back to viewing device 145. In yet another embodiment, additional information database 130 can be located at user location 104.

In one refinement of the exemplary embodiment, an electronic shopping request can be transmitted back to distribution server 140 when the user selects the identified item, which, in turn, causes remote processing system 102 to initiate an electronic shopping interaction with the end user that allows the end user to review and, if he or she elects, purchase the selected item. Exemplary electronic shopping systems and methods are disclosed in U.S. Pat. Nos. 7,752,083 and 7,756,758 and U.S. Patent Publication No. 2010/0138875, the contents of all of which are hereby incorporated by reference.

In addition, one or more secondary systems 150 can be provided at user location 104 and coupled to viewing device 145. These additional systems are additional processors that allow for a wide variety of functionality known to those skilled in the art (e.g., including digital video recorders, email systems, social network systems, etc), but that can be interfaced via a connection to viewing device 145.

It is also noted that while the exemplary embodiment describes the new integrated video stream as a single data stream that includes the source content, the metadata relating to the additional information that is merged in the source content, and the metadata for the X, Y coordinates of the matched items, in an alternative embodiment, two separate data streams containing this information can be transmitted by distribution server 140 to user location 104 and then merged by one or more processors of (or connected to)

viewing device 145. For example, the source content can be transmitted as a first data stream using conventional transmission methods (e.g., standard broadcast, DBS, cable delivered video or the like) and the metadata about the matched items (i.e., the additional information and position information) can be transmitted using conventional IP data communication methods (e.g., wifi, 3G/4G, IP enabled, and the like). In this embodiment, merging processor 135 is located at user location 104 and is coupled to viewing device 145 to perform the same merging processing steps described above.

It should further be understood that while the various components are described to be part of remote processing system 102, it is in no way intended that these components all be located at the same physical location. In an alternative embodiment, one or more of the processes can be performed by processors that are internal or external to viewing device 145. For example, in one embodiment, source content that has not been processed by remote processing system 102 can be transmitted directly to viewing device 145. When the user selects or clicks on a particular element in the source content, a location determination processor provided at viewing device 145 can generate metadata setting the X, Y coordinates for the selected item. This metadata can then be transmitted to remote processing system 102 where the selected element is compared to images in reference content database 115 by matching processor 120. If a match is identified, the processing of this information as described above with respect to the other components of remote processing system 102 is performed and a new integrated video stream is pushed back to the user that includes the additional information about the element initially selected by the user. Further, while each of the components described in remote processing system 102 is provided with one or more specific functions, each component is by no means intended to be limited to these functions. For example, different components can provide different processing functions within the context of the invention and/or a single component can perform all of the functions described above with respect to the exemplary embodiment.

Finally, it should be understood that each of the aforementioned components of remote processing system 102 and user location 104 comprises all requisite hardware and software modules to enable communication between each of the other respective components. These hardware components can include conventional I/O interfaces, such as modems, network cards, and the like. Such hardware components and software applications are known to those skilled in the art and have not been described in detail so as not to unnecessarily obscure the description of the invention herein. Moreover, program instructions for each of the components can be in any suitable form. In particular, some or all of the instructions may be provided in programs written in a self-describing computer language, e.g., Hyper Text Markup Language (HTML), eXtensible Markup Language (XML) or the like. Transmitted program instructions may be used in combination with other previously installed instructions, e.g., for controlling a manner of display of data items described in a received program markup sheet.

Figure 2:
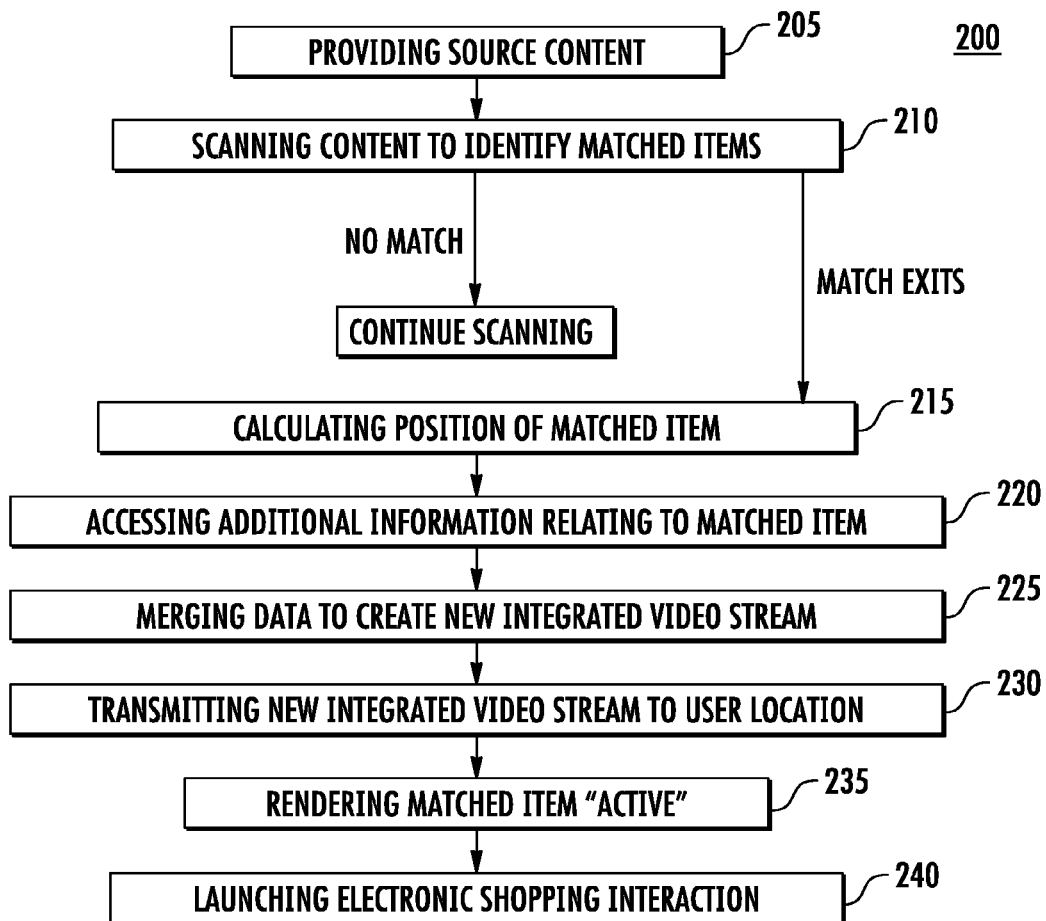
FIG. 2 illustrates a flowchart for a method for recognizing items in media data and delivery of related information in accordance with an exemplary embodiment.

FIG. 2 illustrates a flowchart for a method 200 for recognizing items in media data and delivery of related information in accordance with an exemplary embodiment. The following method is described with respect to the components of FIG. 1 and their associated functionality as discussed above.

As shown in FIG. 2, initially, at step 205, content source 110 at remote processing system 102 generates a source picture or video that is provided to matching processor 120. At step 210, matching processor 120 uses known scanning methods and/or other image matching techniques to compare elements in the source content to item images stored in reference content database 115. These images can include a wide variety of things. For example, the stored images can related to consumer products (e.g., electronics, apparel, jewelry, etc.), marketing or brand items (e.g., logos, marks, etc.), individuals, locations (e.g., buildings, landmarks, etc.) or any other elements that are capable of being identified in the source content. If no match is identified, remote processing system 102 does nothing and matching processor 120 continues to scan the source content provided by content source 110. Furthermore, in an additional embodiment, the areas of the content source data that do not contain any identified items can be identified as such.

Alternatively, if matching processor 120 identifies a match between the element in the source content and the reference item images in reference content database 115, method 200 proceeds to step 215 in which the position of the matched item is calculated by location determination processor 125. Specifically, at step 215, location determination processor 125 generates metadata setting the X, Y coordinates for each matched item's position. Next, at step 220, remote processing system 102 accesses additional information database 130 to identify additional information relating to the identified item. This information can include descriptive or relational information related to the items including pricing information, sizing information, product description, product reviews and the like, as well as links to other information sources such as Internet websites, or, in the alternative, a data path to this detailed information.

Once the additional information is identified, the method proceeds to step 225 where merging processor 135 merges together this additional information, the metadata relating to location information calculated by location determination processor 125, and the source content provided by content source 110 into a format that can be received/interpreted by viewing device 145 at user location 104.

At step 230, the new integrated video stream is then transmitted by distribution server 140 to user location 104. Next, at step 235, when viewing device 145 receives the new integrated video stream, viewing device 145 renders visible or invisible indicators on the matched items making them "active," i.e., the matched items are rendered "selectable" or "clickable" by the end user/consumer and the additional information related to the matched item can be displayed on viewing device 145 in response to the user's selection of the active item. As noted above, this step can also be performed by remote processing system 102. Finally, as an example, at step 240, if a particular item is selected by the user/consumer, remote processing system 102 will launch an electronic shopping interaction with the user/consumer that allows the user/consumer to review and, if he or she elects, purchase the selected item. As noted above, exemplary electronic shopping systems and methods are disclosed in U.S. Pat. Nos. 7,752,083 and 7,756,758 and U.S. Patent Publication No. 2010/0138875.

It should be understood that while method 200 comprises certain steps performed by the components at remote processing system 102 and certain steps performed by the components at user location 104, method 200 is by no way intended to be limited in this regard. For example, as described above, certain processes performed by the components at remote processing system 102 in the exemplary embodiment can, in an alternative embodiment, be performed by processors coupled to viewing device 145. For example, in one embodiment, the source content can be initially transmitted to the user/consumer at user location 104 before it is processed. Once the user selects a particular element, a processor coupled to viewing device 145 can generate metadata representing the X, Y coordinate of the selected item in the source content and this metadata can then be transmitted back to remote processing system 102. The subsequent processing steps discussed above (e.g., the image matching and merging processes) can then be performed on the selected item before the data is pushed back to the user/consumer.

Furthermore, it is contemplated that method 200 can be performed using digital or analog, live or recorded, and still or streaming content provided by content source 110 where the metadata related to the product identity and X, Y coordinates can be stored and delivered with the live or recorded content or, alternatively, this data can be stored at remote processing system 102 (or a combination of remote processing system 102 and user location 104) and served or created dynamically as would be understood to one skilled in the art. Additionally, in the embodiment in which the source content is being generated live or is prerecorded, the matching is occurring so that the content and the item identification and location metadata are synchronously delivered. In an additional embodiment, the content with the related synchronous item identification and location metadata can be stored and played out directly by distribution server 140 to viewing device 145.

It is finally noted that while the foregoing system 100 in FIG. 1 and method 200 in FIG. 2 have primarily been described with respect to image and video data, it is also contemplated that system 100 and method 200 can utilize audio data. For example, reference content database 115 can contain audio items, such as songs or famous individuals' voices, that are capable of being identified in the source content. Matching processor 120 can perform a similar matching process for source content and match audio elements in the source content to the audio items in reference content database 115. Additional information database 130 can also contain additional information about the identified audio items, such as the album of the song or movies, shows, sports teams, political party, etc. relating to the famous individual whose voice is identified. The end user can then selects a designated area in the source content or otherwise indicate an interest in the audio item to receive the additional information using the system and process and described herein.

While the foregoing has been described in conjunction with exemplary embodiments, it is understood that the term "exemplary" is merely meant as an example. Accordingly, the application is intended to cover alternatives, modifications and equivalents, which may be included within the spirit and scope of the system and method for recognizing items in media data and delivery of related information as disclosed herein.

Additionally, in the preceding detailed description, numerous specific details have been set forth in order to provide a thorough understanding of the present invention. However, it should be apparent to one of ordinary skill in the art that the system and method for recognizing items in media data and delivery of related information may be practiced without these specific details. In other instances, well-known methods, procedures, components, and circuits have not been described in detail so as not to unnecessarily obscure aspects of the system and method disclosed herein.

What is claimed is:

1. A device for dynamically recognizing individual items in images contained in video source content, the device comprising:
   a source content interpreter configured to interpret video source content to determine a reference marker characteristic associated with the interpreted video source content;
   a matching processor configured to:
   identify a subset of a plurality of digital images and item metadata related to the identified subset by matching the determined reference marker characteristic of the interpreted video source content with a respective common characteristic of the subset, and
   compare individual items in a plurality of digital images with the plurality of digital images in the identified subset to identify at least one individual item in the plurality of images that matches a corresponding digital image in the identified subset, wherein the matching processor does not compare the individual items in the plurality of images with digital images that are not within the identified subset;
   a merging processor configured to merge the item metadata related to the identified at least one individual item with the interpreted source video content to create a modified video content; and
   a display configured to present the modified video content, such that the respective item metadata related to the identified at least one individual item is accessible to be presented on the display.

2. The device according to claim 1, wherein the identified at least one individual item is accessible to be concurrently presented on the display when the modified video content is being displayed.

3. The device according to claim 1, further comprising an electronic database configured to store the plurality of digital images and the item metadata related to each of the plurality of digital images, wherein the plurality of digital images and the item metadata are organized into a plurality of subsets categorized by respective common characteristics for each of the plurality of sub sets.

4. The device according to claim 1, wherein the identified at least one individual item in the modified video content is configured to be selected by a user selection using at least one of a mouse pointer and a touch screen.

5. The device according to claim 1, wherein the identified at least one individual item in the modified video content is configured to be interpreted and selected automatically by the display.

6. The device according to claim 1, wherein the video source content is one of live video content or prerecorded video content.

7. The device according to claim 1, wherein the matching processor is further configured to generate coordinate position data indicating a position of the identified at least one individual item in the plurality of images contained in the video source content.

8. The device according to claim 7, wherein the display is further configured to display the modified video content with at least one electronic indicator, which is based on the coordinate position data, for the identified at least one individual item such that the identified at least one individual item is rendered active and configured to be selected by a user of the device.

9. The device according to claim 8, wherein the merging processor is configured to merge the item metadata related to the identified at least one individual item with the interpreted source video content, such that identification information of the identified at least one individual item is displayed by the display.

10. The device of claim 8, further comprising at least one processor configured to initiate an electronic shopping interaction in response to a selection of the active and identified at least one individual item.

11. The device of claim 1, wherein at least the display is provided on at least one of a computer, a smartphone, a tablet, a PDA, a television, a display with a set-top box type processor, a Blu-ray player, and a video game console.

12. The device of claim 9, wherein the item metadata is configured to make active the identified at least one individual item with either a visible or an invisible indicator when the identification information is rendered by the display.

13. A method for dynamically recognizing individual items in images contained in video source content, the method comprising:
    interpreting video source content to determine a reference marker characteristic associated with the interpreted video source content;
    identifying a subset of a plurality of digital images and item metadata related to the identified subset by matching the determined reference marker characteristic of the interpreted video source content with a respective common characteristic of the subset;
    comparing individual items in a plurality of digital images with the plurality of digital images in the identified subset to identify at least one individual item in the plurality of images that matches a corresponding digital image in the identified subset, wherein the matching processor does not compare the individual items in the plurality of images with digital images that are not within the identified subset;
    merging the item metadata related to the identified at least one individual item with the interpreted source video content to create a modified video content; and
    displaying, on a display screen, the modified video content, such that the respective item metadata related to the identified at least one individual item is accessible to be presented on the display.

14. The method according to claim 13, further comprising configuring the identified at least one individual item to be concurrently presented on the display when the modified video content is being displayed.

15. The method according to claim 13, further comprising:
    storing, in an electronic database, the plurality of digital images and the item metadata related to each of the plurality of digital images; and
    organizing, in the electronic database, the plurality of digital images and the item metadata into a plurality of subsets categorized by respective common characteristics for each of the plurality of subsets.

16. The method according to claim 13, further comprising configuring the identified at least one individual item in the modified video content to be selected by a user selection using at least one of a mouse pointer and a touch screen.

17. The method according to claim 13, further comprising configuring the identified at least one individual item in the modified video content to be interpreted and selected automatically by the display.

18. The method according to claim 13, wherein the video source content is one of live video content or prerecorded video content.

19. The method according to claim 13, further comprising generating coordinate position data indicating a position of the identified at least one individual item in the plurality of images contained in the video source content.

20. The method according to claim 19, further comprising displaying, on the display screen, the modified video content with at least one electronic indicator, which is based on the coordinate position data, for the identified at least one individual item such that the identified at least one individual item is rendered active and configured to be selected by a user of the device.

21. The method according to claim 19, further comprising merging the item metadata related to the identified at least one individual item with the interpreted source video content, such that identification information of the identified at least one individual item is displayed by the display screen.

22. The method of claim 20, further comprising initiating an electronic shopping interaction in response to a selection of the active and identified at least one individual item.

23. The method of claim 22, further comprising configuring the item metadata to make active the identified at least one individual item with either a visible or an invisible indicator when the identification information is rendered by the display screen.

* * * * *